ively, the end panel 26 is bounded by the central fold line 13 and by fold lines 18, 28, 29. The end panel 27 is bounded by fold lines 19, 30, 31, 32. As

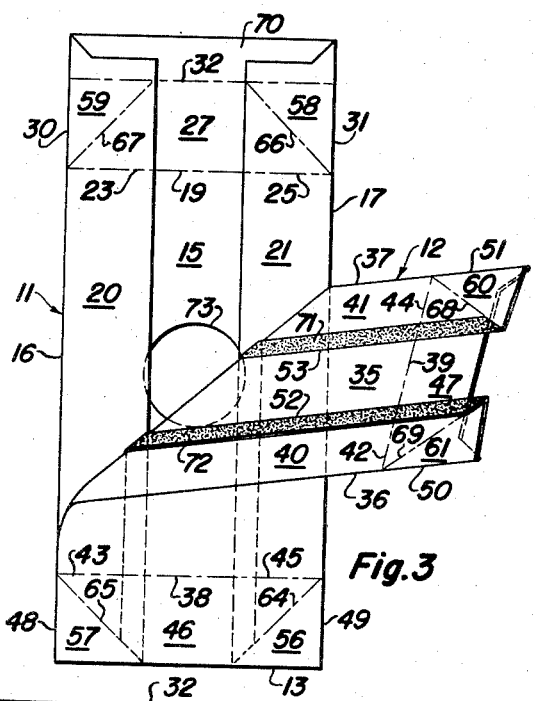
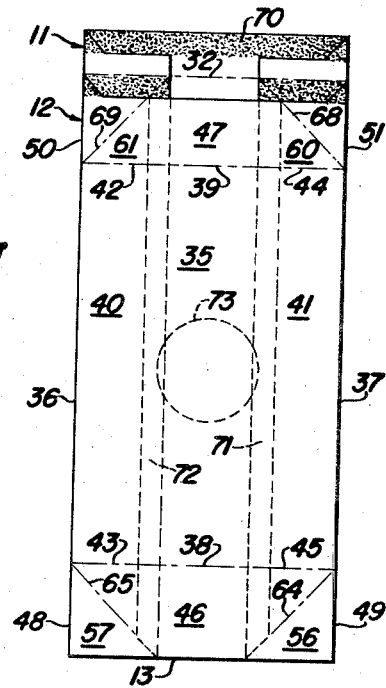
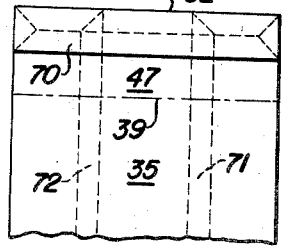
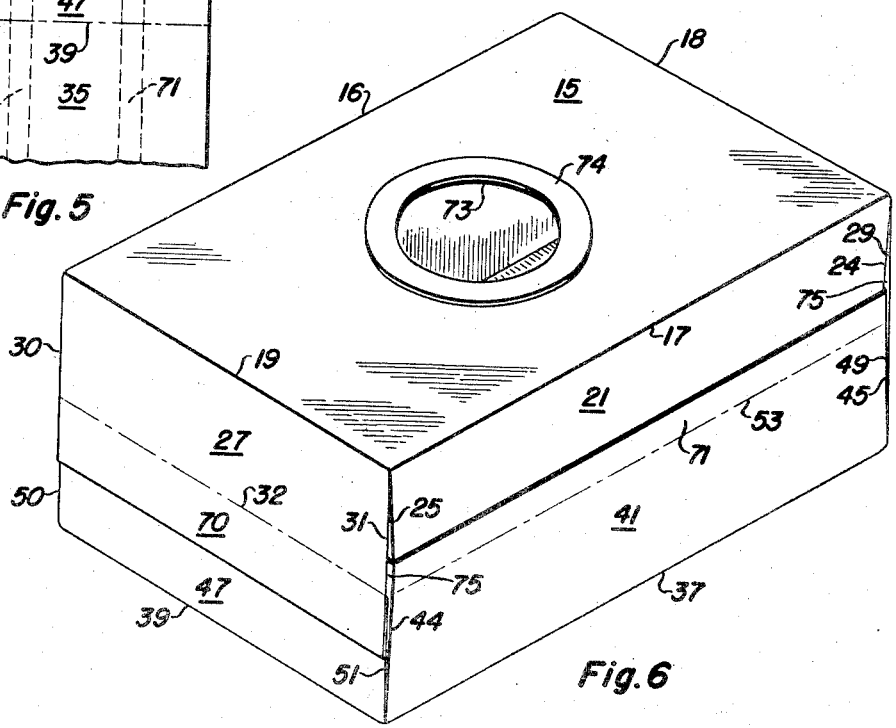

United States Patent Office 2,832,433
Patented Apr. 29, 1958

2,832,433

RECTANGULAR FILTER BAGS

George A. Brace, San Carlos, Calif., assignor to The Hoover Company, North Canton, Ohio, a corporation of Delaware Application October 25, 1954, Serial No. 464,235

19 Claims. (Cl. 183—51)

The instant invention relates to suction cleaner filter bags adapted to be used in suction cleaners for filtering dust and like litter from the dirty air stream generated by the cleaner.

It is the prime object of the instant invention to provide a novel filter bag construction which greatly facilitates the fabrication of the filter bag, and produces a filter bag of a particularly desirable form and having a large filter area for performing the aforementioned function.

It is a further object of the instant invention to provide a blank of filter material having a novel form for the fabrication of the aforesaid filter bag.

It is still another object of the instant invention to provide a blank of filter material having a novel form for the fabrication of a filter bag, which blank is preformed and precreased to facilitate the fabrication thereof into a filter bag, the article thus formed being in folded flat condition, and the creases provided therein permitting the article to be expanded to constitute a closed filtering chamber for use with a suction cleaner, to separate the dust and like litter from the dirty air stream generated thereby.

Further objects and advantages of the instant invention will be apparent to those skilled in the art from a consideration of the detailed description of a preferred embodiment thereof which follows reference being had to the drawings in which:

Figure 3 is a view of the blank with the lower blank section partially folded on top of the upper blank section;

Figure 4 is a view of the blank with the lower blank section completely folded over on the upper blank section;

Figure 5 is a view of the blank with the ends of the upper and lower blank sections sealed; and Figure 6 is a perspective view of the novel filter bag in its expanded form.

Figures 1, 2:
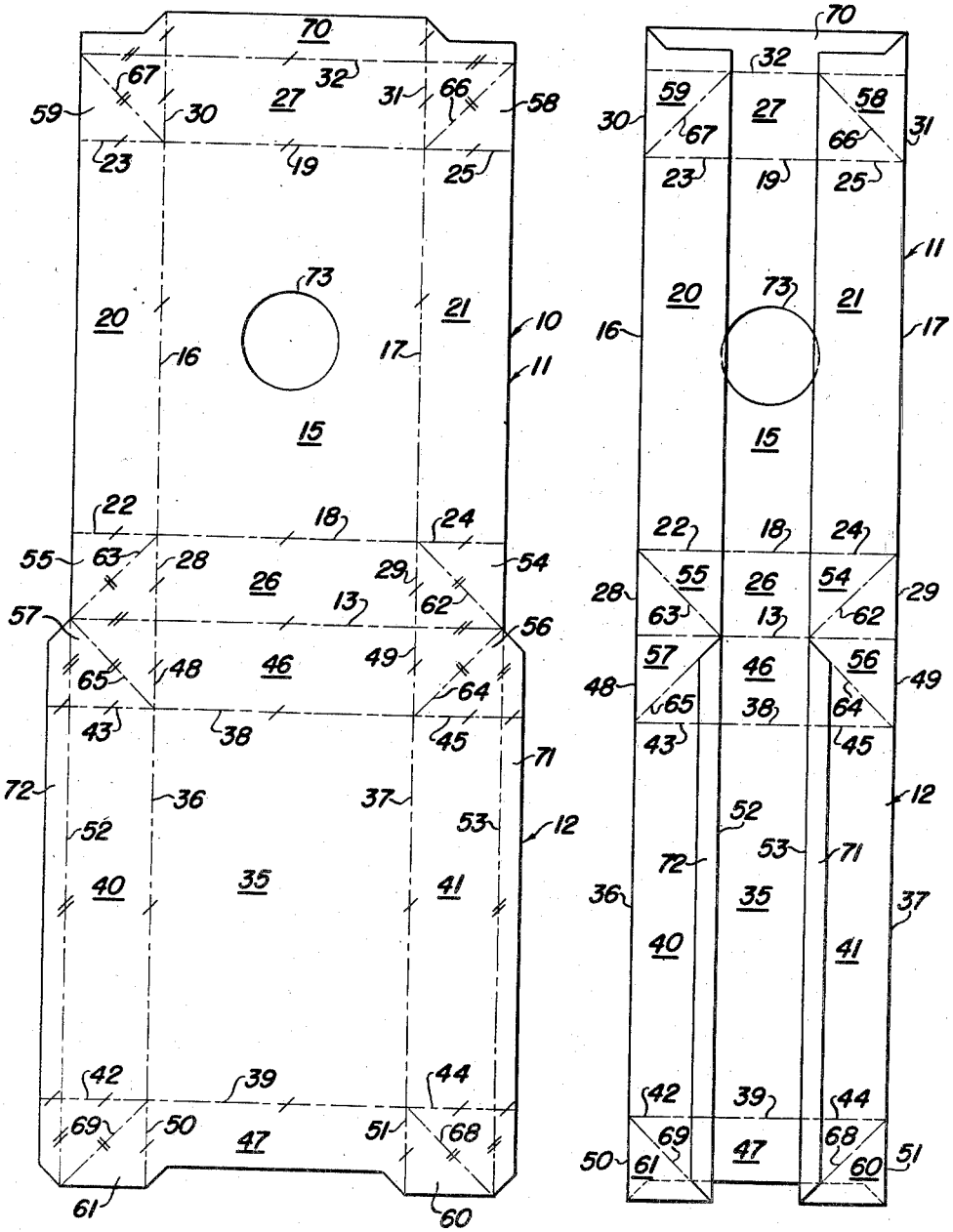
Figure 1 is a plan view of the filter bag blank.
Figure 2 is a plan view of the blank of Figure 1 with the side panels folded inwardly.

The instant invention relates primarily to the construction of disposable filter bags, although the invention may be utilized in the manufacture of other types of filter bags as well. Such filter bags are well known in the art and are most usually constructed of relatively inexpensive air pervious paper which is impervious to the passage of dust and like litter. Accordingly, the filter bag may be constructed to constitute a closed chamber having an air inlet opening formed in a wall thereof for connection with a suction cleaner, the dirty air stream generated by the suction cleaner being directed into the air inlet opening of the filter bag, and being filtered by the walls thereof to separate the dust and like litter from the air stream and retain the same within the confines of the bag.

Referring to Figure 1 there is illustrated a blank 10 formed in accordance with the instant invention from air pervious material such as paper stock having the requisite filter properties, and which is preformed and precreased for the fabrication of the novel filter bag. The blank 10 comprises upper and lower complementary blank sections 11, 12 symmetrically disposed on opposite sides of a fold line 13 extending transversely the width of the blank 10. The upper blank section 11 includes a substantially centrally disposed panel 15 bounded by side fold lines 16, 17 on opposite sides thereof and end fold lines 18, 19 at opposite ends thereof. The panel 15 constitutes a principal filter wall of the filter bag and is illustrated in the preferred embodiment as being rectangular although it may assume other configurations as well.

At the sides of the panel 15 there are provided side panels 20, 21 joined to the panel 15 by the fold lines 16, 17, respectively. The side panel 20 is bounded by fold line 16 and laterally extending fold lines 22, 23. The side panel 21 is bounded by the fold line 17 and by laterally extending fold lines 24, 25. At the ends of the centrally disposed panel 15 there are provided end panels 26, 27 joined to the panel 15 by the fold lines 18, 19, respectively. The end panel 26 is bounded by the central fold line 13 and by fold lines 18, 28, 29. The end panel 27 is bounded by fold lines 19, 30, 31, 32. As will appear from the description of the invention, the panel 15 forms a principal filtering wall of the filter bag, panels 20, 21 each constitute a portion of the side filtering walls of the filter bag, and panels 26, 27 each constitute a portion of the end filtering walls of the filter bag.

The lower blank section 12 is formed similarly to the upper blank section 11, and includes a substantially centrally disposed panel 35 to constitute a second principal filter wall of the filter bag, bounded by opposite side fold lines 36, 37, and opposite end fold lines 38, 39. Side panels 40, 41 are located on opposite sides of the principal panel 35, the panel 40 being bounded by fold lines 36, 42, 43, 52 and the side panel 41 being bounded by fold lines 37, 44, 45, 53. End panels 46, 47 are disposed at the opposite ends of the principal panel 35, the panel 46 being bounded by the laterally extending fold line 13 and fold lines 38, 48, 49, and the end panel 47 being bounded by fold lines 39, 50, 51.

The blank 10 is formed to produce a rectangular filter bag defined by the principal filter panels 15, 35, and the side and end panels are disposed at right angles with respect to the principal filter panels and with respect to each other, these also having a substantially rectangular configuration. The corner at the junction of each of the side and end panels is filled in by square panel sections 54, 55; 56, 57; 58, 59; 60, 61, each of these square panel sections being crossed by an obliquely extending fold line 62, 63; 64, 65; 66, 67; 68, 69, respectively, each of which is angularly directed from a corner of the principal panels 15, 35. The upper panel section 11 further includes a gluing tab 70 at the upper end thereof extending laterally across said panel section for sealing an end of the filter bag. The lower panel section 12 includes oppositely disposed gluing tabs 71, 72 on opposite sides thereof extending the length of the lower panel section 12 for sealing the sides of the filter bag.

The blank 10 may be blanked from suitable filter material such as air pervious paper stock on a conventional die press having a cutting die formed to the illustrated configuration and including a die for punching an opening 73 in one of the panels of the blank 10 to constitute an air inlet mouth for the filter bag for connection to the suction cleaner. In the preferred embodiment the air inlet opening 73 is located in one of the principal panels 15, 35 but it may be located with equal facility in any of the other walls of the filter bag.

Subsequent to or concurrently with the process of blanking the filter bag blank, it is precreased on the fold lines illustrated in Figure 1 to facilitate the operation of fabricating the novel filter bag. The creasing operation may also be performed with conventional press means such as are well known in the art. Certain of the creases will be directed inwardly while others are directed outwardly. It is to be understood that the terms "outwardly" and "inwardly" are used merely as a matter of convenience and that it is not material in which direction creases are made, but merely that certain creases must be oppositely directed with respect to others as will be apparent as the description proceeds.

In Figure 1, each of the fold lines in the blank 10 is marked with a code to indicate the direction of folding thereof, a single zip mark being used to indicate an outward crease or a crease directed downwardly of the paper and a double zip mark being used to indicate an inward crease, or a crease directed upwardly of the paper, it being material only that each of the creases impressed upon the fold lines be properly directed with respect to each of the other creases in the blank.

*Fabrication of the filter bag*

The first step in fabricating the filter bag of this invention is to fold the pairs of side panels 41, 21 and 20, 40 in toward each other to lie flat on the panels 15, 35. The corner panels 54, 56, 58, 60 and tab 71 are folded inwardly with the side panels 21, 41 to lie in the same plane as these latter panels. The corner panels 55, 57, 59, 61 and the tab 72 are also folded inwardly with the side panels 20 and 40. The tabs 71, 72 are then folded outwardly in opposite directions to lie flat on top of the side panels 40, 41, respectively. The blank thus folded assumes the form illustrated in Figure 2. Any suitable adhesive may then be applied to the exposed faces of the tabs 71, 72 and the lower panel section 12 folded on top of the upper panel section 11 on the transverse fold line 13, as illustrated in Figure 3. Upon completion of this last operation, the blank takes the form illustrated in Figure 4 with the lower panel section secured to the upper panel section by means of the adhesive applied to tabs 71, 72.

With the filter bag partially formed as illustrated in Figure 4, a portion of the upper panel section 11 remains exposed beyond the superimposed lower panel section 12. This exposed portion includes the gluing tab 70 to which an adhesive is applied over the stippled area as shown in Figure 4. Referring to Figure 1 it is seen that the end panel 47 is cut back along the edge of the blank 10 in order to expose portions of corner panels 60, 61 when the blank is folded as illustrated in Figure 4. These exposed portions of the corner panels 60, 61 also constitute sealing tabs as illustrated by the stippled area in Figure 4. An adhesive is applied to the aforementioned portion of the sealing tab 70 and the sealing tab portions of the corner panels 60, 61 for sealing the end of the filter bag. This is accomplished by folding the exposed portion of the upper panel section 11 over on the lower panel section 12 along the fold line 32 shown in Figure 1. The filter bag is now completed and will be in a folded flat form as illustrated in Figure 5. The filter bag as thus produced in its folded flat form provides an article which may be very conveniently and efficiently packaged. The filter bag of this invention may be assembled with a suction cleaner in the usual manner by connection to the air inlet mouth 73 thereto. The mouth may be reinforced to avoid tearing the material of the bag merely by securing a ring 74 of cardboard or like stiff material around the periphery thereof. Upon operation of the suction cleaner the bag will be automatically expanded to the rectangular form illustrated in Figure 6 without any further operation on the part of the user. It will be apparent that the corner panels fold on the diagonal fold lines crossing these panels to form the tucked folds 75, permitting the bag to assume the form illustrated in Figure 6.

The foregoing description is of a preferred embodiment of the invention. It will be apparent to those skilled in the art that the illustrated embodiment of the invention is subject to modifications falling within the scope of the invention and, accordingly, it is not intended that the invention be limited except as set forth in the claims which follow.

I claim:

1. A filter bag for use with a suction cleaner, said bag having oppositely disposed principal filter walls, oppositely disposed side walls and oppositely disposed end walls intermediate said principal walls spacing said principal walls from each other to define therewith a closed chamber for the reception and retention of dust and like litter, said bag formed from a blank of filter material folded along a pair of spaced longitudinally extending fold lines defining therebetween said principal walls and end walls, said side walls defined by marginal portions of said blank adjacent said fold lines, said bag being fabricated by folding said blank upon itself along a transverse line to superimpose said marginal portions constituting said side walls, one end wall arranged between adjacent ends of said principal walls, and another end wall comprising portions of said blank at the opposite ends of said principal walls.

2. A filter bag as recited in claim 1 in which the adjacent edges of the blank are sealed forming seams disposed in the side walls and said another end wall.

3. A filter bag as recited in claim 2 in which the seams are centrally disposed in said side walls and said another end wall extending longitudinally thereof, said side and another end walls being creased along said seams and said one end wall being creased to correspond to said another end wall, permitting the filter bag to be folded flat with the principal filter walls disposed contiguously to each other.

4. A filter bag for use with a suction cleaner, said bag having oppositely disposed principal filter walls, oppositely disposed side walls and oppositely disposed end walls intermediate said principal walls spacing said principal walls from each other to define therewith a closed chamber for the reception and retention of dust and like litter, said bag formed from a blank of filter material folded along a pair of spaced longitudinally extending fold lines defining therebetween said principal walls and end walls, said side walls defined by marginal portions of said blank adjacent said fold lines, said bag being fabricated by folding said blank upon itself along a transverse line to superimpose said marginal portions constituting said side walls, one end wall arranged between adjacent ends of said principal walls, and another end wall comprising portions of said blank at the opposite ends of said principal walls, said bag being adapted to be folded flat with the principal walls disposed contiguously to each other, said side and end walls being precreased for folding said bag as aforesaid.

5. A filter bag as recited in claim 4 in which one of said filter bag walls includes an air inlet opening adapted to be connected to a suction cleaner for directing a dirty air stream into the filter bag to separate dust and like litter therefrom.

6. A filter bag as recited in claim 4 in which each of said marginal portions of the blank forms one half of the respective side walls, the adjacent edges of the blank being sealed and forming seams centrally disposed in the side walls and said another end wall.

7. A filter bag as recited in claim 4 in which the side walls and the end walls each include a crease extending longitudinally thereof intermediate the principal filter walls, for folding the filter bag flat with the side and end walls folded flat on said longitudinal creases and the principal filter walls disposed contiguously to each other.

8. A filter bag as recited in claim 4 in which each of the end walls includes a longitudinally extending crease directed outwardly of the filter bag, and each of the side walls includes a longitudinally extending crease directed inwardly of the filter bag, said creases being centrally disposed in said side and end walls intermediate the principal filter walls, said filter bag being adapted to be folded flat with the principal filter walls disposed contiguously to each other, said side walls being folded flat between the principal filter walls, and the end walls being folded flat and projecting beyond the ends of the principal filter walls outwardly of the filter bag.

9. A filter bag as recited in claim 8 including tuck folds at the junctions between each of the side walls and end walls for folding said side walls and end walls in opposite directions with respect to the filter bag.

10. A filter bag as recited in claim 4 in which said principal filter walls are parallel to each other, and said side and end walls are disposed at right angles to said principal walls and to each other, forming a rectangular filter bag.

11. A blank of filter material for fabricating a filter bag comprising, complementary blank sections at opposite sides of a fold line, each of said blank sections comprising a principal filtering panel, side panels disposed on opposite sides of each of said principal panels, and end panels disposed on the opposite ends of said principal panels, said complementary blank sections being adapted to be superimposed upon each other by folding along said fold line with the principal filtering panels oppositely disposed and the side and end panels joined, said blank sections being uncut from their peripheral edges to constitute a closed chamber having the principal filtering walls spaced from each other by side and end walls comprising the side and end panels, respectively, defining a closed chamber into which a dirty air stream may be directed for separation of the dust and like litter therefrom.

12. A blank of filter material for fabricating a filter bag as recited in claim 11, in which the side panels in one of said blank sections each includes a sealing tab projecting therefrom and coextensive therewith for joining each of the side panels in one of said blank sections to the correspondingly disposed side panel in the other of the blank sections and providing a sealed seam between the corresponding side panels.

13. A blank of filter material for fabricating a filter bag as recited in claim 12, in which the opposite ends of the blank include sealing tabs for sealing said ends on each other.

14. A blank of filter material for fabricating a filter bag comprising, substantially rectangular complementary blank sections disposed end to end at a fold line to form a substantially rectangular blank, each of said blank sections comprising a substantially centrally located rectangular principal filtering panel, rectangular side panels disposed on opposite sides of each of said principal panels, and rectangular end panels disposed on opposite ends of said principal panels, said complementary blank sections being adapted to be superimposed upon each other with the principal filtering panels oppositely disposed and the side and end panels joined, said blank sections being uncut from their peripheral edges to constitute a closed chamber having the principal filtering walls spaced from each other by side and end walls comprising the side and end panels, respectively, defining a closed chamber into which a dirty air stream may be directed for separation of the dust and like litter therefrom.

15. A blank of filter material for fabricating a filter bag comprising, substantially rectangular complementary blank sections disposed end to end to form a substantially rectangular blank, each of said blank sections comprising a substantially centrally located principal filtering panel, side panels disposed on opposite sides of each of said principal panels and forming side marginal areas of the filter blank, a pair of end panels disposed one in each blank section intermediate the principal filtering panels, and a second pair of end panels disposed adjacent the opposite ends of the principal filtering panels and forming end marginal areas of the filter blank, said complementary blank sections being defined by a transversely extending fold line intermediate the first said end panels, said complementary blank sections being adapted to be superimposed upon each other by folding on said fold line with the principal filtering panels oppositely disposed and the side and end panels joined, said blank sections being uncut from their peripheral edges to constitute a closed chamber having the principal filtering walls spaced from each other by side and end walls comprising the side and end panels, respectively, defining a closed chamber into which a dirty air stream may be directed for separation of the dust and like litter therefrom.

16. A blank of filter material for fabricating a filter bag as recited in claim 15 in which the side panels are coextensive with the length of the principal filtering panels and the end panels are coextensive with the width of the principal filtering panels, said blank being adapted to be assembled to form a rectangular filter bag.

17. A blank of filter material for fabricating a filter bag as recited in claim 15 including a corner panel at each of the junctions of the side and end panels, said corner panels being adapted to be folded inwardly intermediate the side and end walls of the filter bag upon erection of the same and connecting the side and end walls.

18. A blank of filter material for fabricating a filter bag comprising, complementary blank sections, each of said blank sections comprising a principal filtering panel, side panels disposed on opposite sides of each of said principal panels, said side panels being separated from the principal panels by precreased fold lines, end panels disposed on opposite ends of said principal panels, said end panels being separated from the principal panels by precreased fold lines, said complementary blank sections being adapted to be superimposed upon each other with the principal filtering panels oppositely disposed and the side and end panels joined, said blank sections being uncut from their peripheral edges to constitute a closed chamber having the principal filtering walls spaced from each other by side and end walls comprising the side and end panels, respectively, defining a closed chamber into which a dirty air stream may be directed for separation of dust and like litter therefrom, said precreased fold lines facilitating erection of the filter bag with said side and end walls laterally disposed with respect to the principal filtering walls.

19. A blank of filter material for fabricating a filter bag as recited in claim 18, including a transversely extending fold line intermediate the blank sections for superimposing said blank sections upon each other by folding on said fold line.

References Cited in the file of this patent

UNITED STATES PATENTS

| | | |
|---|---|---|
| 2,223,754 | Waters | Dec. 3, 1940 |
| 2,228,647 | Waters | Jan. 14, 1941 |
| 2,445,757 | Belcher | July 17, 1948 |
| 2,564,845 | Holt | Aug. 21, 1951 |
| 2,577,863 | Sosnowich | Dec. 11, 1951 |